US007233888B2

(12) United States Patent
Chiang et al.

(10) Patent No.: US 7,233,888 B2
(45) Date of Patent: Jun. 19, 2007

(54) MONTE CARLO CRITICALITY-MODE SYSTEMS AND METHODS FOR COMPUTING NEUTRON AND GAMMA FLUENCE IN A NUCLEAR REACTOR

(75) Inventors: Ren-Tai Chiang, San Jose, CA (US); Shivakumar Sitaraman, San Jose, CA (US); Alton Lewis Jenkins, Huntersville, NC (US)

(73) Assignee: General Electric Company, Schenectady, NY (US)

( * ) Notice: Subject to any disclaimer, the term of this patent is extended or adjusted under 35 U.S.C. 154(b) by 768 days.

(21) Appl. No.: 10/191,620

(22) Filed: Jul. 9, 2002

(65) Prior Publication Data

US 2004/0009455 A1    Jan. 15, 2004

(51) Int. Cl.
G06G 7/48 (2006.01)
G01N 21/01 (2006.01)
G01N 21/51 (2006.01)
G01N 23/10 (2006.01)

(52) U.S. Cl. .................. 703/6; 703/2; 703/7; 250/428; 250/432 R

(58) Field of Classification Search .................. 703/2, 703/7, 6; 250/432 R, 428
See application file for complete search history.

(56) References Cited

U.S. PATENT DOCUMENTS

| 5,912,933 A | 6/1999 | Shaug et al. |
| 6,163,589 A | 12/2000 | Vartanian |
| 2005/0105675 A1* | 5/2005 | Sitaraman et al. .......... 376/305 |

OTHER PUBLICATIONS

U.S. Nuclear Regulatory Commission Regulatory Guide 1.190. "Calculational and Dosimetry Methods for Determining Pressure Vessel Neutron Fluence." Mar. 2001. http://www.nrc.gov/reading-rm/doc-collections/reg-guides/power-reactors/active/01-190/01-190.pdf.*
U.S. Nuclear Regulatory Commission 478th Advisory Committee on Reactor Standards (ACRS). Proceedings from the meeting of Dec. 7, 2000. http://www.nrc.gov/reading-rm/doc-collections/acrs/tr/fullcommittee/2000/ac001207.html.*
Guo, Pingjun et al. "Technical Progress Report: Development of Monte Carlo Codes and Gamma-Ray Spectroscopy Unfolding Algorithms for Nuclear Logging Techniques." Aug. 1997. http://www.ne.ncsu.edu/research/Cear/tech_rpt.pdf.*
Doolen, G.D. et al. "Monte Carlo at Work." Los Alamos Science Special Issue. 1987. pp. 142-143. http://www.fas.org/sgp/othergov/doe/lanl/pubs/00418730.pdf.*

(Continued)

Primary Examiner—Paul Rodriguez
Assistant Examiner—Ayal Sharon
(74) Attorney, Agent, or Firm—Armstrong Teasdale LLP

(57) ABSTRACT

A method for simulating three-dimensional spatial distribution of neutron and gamma fluences in a nuclear reactor includes, in an exemplary embodiment, generating a detailed geometric configuration of a nuclear reactor core and surrounding components, generating detailed fuel composition and concentration distribution, and calculating three-dimensional nuclide concentrations for the fuel rods and the water surrounding the fuel rods using the generated geometric configuration and generation fuel composition and concentration distributions. The method also includes calculating neutron and gamma fluxes using a Monte Carlo radiation transport criticality mode methodology, and generating a neutron and gamma fluence map for predetermined areas of the reactor.

24 Claims, 4 Drawing Sheets

OTHER PUBLICATIONS

CCC-0588 MORSE-EMP. "Monte-Carlo Neutron and Gamma MultiGroup Transport with Array Geometry." Feb. 8, 1994. http://www.nea.fr/abs/html/ccc-0588.html.*

Hall, J. "Monte Carlo Modeling of Neutron and Gamma-Ray Imaging Systems." Last modified: Mar. 7, 1996. http://www-phys.llnl.gov/N_Div/COG/Quarterly/COG_March_Hall.html.*

Curl, Ian. "ANSWERS Conference Paper: Virtual Experiments with the Monte Carlo code MCBEND." 5th Int'l Conf. on the Application of Nuclear Techniques. Jun. 9-15, 1996.*

Ueki, K. et al. "Application of the Monte Carlo Coupling Technique for Evaluating Shielding Ability of a Modular Shielding House." Proc. of the 9th EGS4 User's Meeting in Japan. KEK Proceedings 2001-22, pp. 16-21.*

Rearden, B.T. et al. "Comparison of Sensitivity Analysis Techniques in Monte Carlo Codes for Multi-Region Criticality Calculations." American Nuclear Society 2001 Winter Meeting, Nov. 11-15, 2001. http://www.ornl.gov/sci/scale/tsunami/references/ans2001-1.pdf.*

Urbatsch, T.J. et al. "Monte Carlo Solution of a Spatially-Discrete Transport Equation. Part I: Transport." 1999. http://www.ccs.lanl.gov/ccs4/pdf/mc99_sinf.pdf.*

Evans, T.M. et al. "A Residual Monte Carlo Method for Discrete Thermal Radiative Diffusion." Journal of Computational Physics. vol. 189, Issue 2. Aug. 2003.*

Urbatsch, T.J. et al. "Monte Carlo Solution of a Spatially-Discrete Transport Equation. Part II: Diffusion and Transport/Diffusion." 1999. http://www.ccs.lanl.gov/ccs4/pdf/mc99_ddmc.pdf.*

Hendricks, John. "A Monte Carlo Code for Particle Transport: An Algorithm for All Seasons." Los Alamos Science. No. 22. 1994. http://library.lanl.gov/cgi-bin/getfile?00326727.pdf.*

Blomquist, R.N. "VIM: Monte Carlo Neutron/Photon Transport Code." Last modified on Mar. 4, 2005. http://www.vim.anl.gov/code_abstract.html.*

U.S. Dept. of Energy, "Nuclear Criticality Safety Program: Five-Year Plan." Oct. 2004. http://www.deprep.org/2005/AttachedFile/tb05f01b_enc2.pdf.*

Nuclear Energy Agency. "CCC-0127: MORSE". Last modified Oct. 18, 1983. http://www.nea.fr/abs/html/ccc-0127.html.*

Advanced Lattice Physics Methods and Their Impact on LWR Core Simulations—II; pp. 371 and 372; Transactions of the American Nuclear Society, vol. 72, Jun. 25-29, 1995, Eric A. Blocher, Technical Program Chair; Irene O. Macke (ANS), Editor.

Development and Validation of TGBLA BWR Lattice Physics Methods; pp. 364 to 375; Topical Meeting on Reactor Physics and Shielding, American Nuclear Society, vol. 1, Sep. 17-19, 1984; Munenari Yamamoto and Hiroshi Mizuta.

Criticality Analysis of Heterogeneous Light Water Reactor Configurations, Nuclear Science and Engineering: 113, 239-250; Mar. 1993; S. Sitaraman and F. Rahnema.

Los Alamos National Laboratory; MCNP Publications Page—Judith Briesmeister; "About MCNP™", printed Apr. 26, 2002.

Los Alamos National Laboratory; MCNP Publications Page—Judith Briesmeister; LA Reports Available On the Web; "MNCP—A General Monte Carlo N-Particle Transport Code", printed Apr. 26, 2002.

* cited by examiner

MONTE CARLO CRITICALITY-MODE SYSTEMS AND METHODS FOR COMPUTING NEUTRON AND GAMMA FLUENCE IN A NUCLEAR REACTOR

BACKGROUND OF THE INVENTION

This invention relates generally to nuclear reactors and more particularly, to systems and methods for computing neutron and gamma fluence in a nuclear reactor.

A reactor pressure vessel (RPV) of a boiling water reactor (BWR) typically has a generally cylindrical shape and is closed at both ends, e.g., by a bottom head and a removable top head. A core assembly is contained within the RPV and includes the core support plate, fuel bundles, control rod blades and a top guide. A core shroud typically surrounds the core assembly and is supported by a shroud support structure. Particularly, the shroud has a generally cylindrical shape and surrounds both the core plate and the top guide. There is a space or annulus located between the cylindrical reactor pressure vessel and the cylindrically shaped shroud.

The core of the reactor includes an array of fuel bundles with square cross section. The fuel bundles are supported from below by a fuel support. Each fuel support supports a group of four fuel bundles, with the exception of the peripheral fuel supports which support a single fuel bundle. The thermal power generated in the core can be decreased by inserting control rods into the core, and the generated thermal power can be increased by retracting control rods from the core. In some BWR's, the control rods have a cruciform cross section with blades that can be inserted between the fuel bundles of a group of four.

Internal structures of operating BWRs are susceptible to various corrosive and cracking processes. Stress corrosion cracking (SCC) is one known phenomenon occurring in reactor components, such as structural members, piping, control rod guide tubes, fasteners, and welds, exposed to high temperature water. The reactor components are subject to a variety of stresses associated with, for example, differences in thermal expansion, the operating pressure needed for the containment of the reactor cooling water, and other sources such as residual stresses from welding, cold working and other inhomogeneous metal treatments. In addition, water chemistry, welding, heat treatment and radiation can increase the susceptibility of metal in a component to SCC.

It has been recognized that radiation creates oxygen and hydrogen peroxide via radiolysis, and that these chemical species significantly increase the electrochemical corrosion potential (ECP) throughout the primary circuit. This, in turn, assists stress corrosion cracking (SCC) and irradiation-assisted stress corrosion cracking (IASCC) of internal components of RPVs. Neutron radiation is especially efficient at creating oxygen and hydrogen peroxide in the reactor water within the core, while gamma radiation tends to promote the reduction of these species by hydrogen within the downcomer.

As nuclear power plants age, there is a growing need to better understand age-related degradation of the reactor pressure vessel and its internal components. At present, radiation dose is estimated by deterministic neutron transport codes. The accuracy of these estimates is not considered high enough due to inherent approximations in the geometric model of the system and the nuclear cross-section database. Accuracy is a particular problem in RPV regions where the dose gradient is very high, for example, outside the BWR core. There is presently a wide gap between the accuracy of present methods available compared to the desired accuracy to reliably evaluate continued degradation over time. The gap becomes even greater when continued operation for extended plant lifetimes is considered.

BRIEF DESCRIPTION OF THE INVENTION

In one aspect, a method for simulating three-dimensional spatial distribution of neutron and gamma fluences in a nuclear reactor is provided. The reactor includes a reactor pressure vessel and a reactor core surrounded by a core shroud positioned in the reactor pressure vessel. The method includes generating a detailed geometric configuration of a nuclear reactor core and surrounding components, generating a detailed fuel composition distribution, and calculating three-dimensional nuclide concentrations for the fuel rods and the water surrounding the fuel rods using the generated geometric configuration and generated fuel composition distribution. The method also includes calculating thermal and fast neutron and gamma fluxes using a Monte Carlo radiation transport criticality mode methodology, and generating thermal and fast neutron and gamma fluence maps for predetermined areas of the reactor.

In another aspect, a system for simulating three-dimensional spatial distribution of neutron and gamma fluences in a nuclear reactor is provided. The reactor includes a reactor pressure vessel and a reactor core surrounded by a core shroud positioned in the reactor pressure vessel. The system includes a computer configured to generate a detailed geometric configuration of a nuclear reactor core and surrounding components, generate a detailed fuel composition distribution, and calculate three-dimensional nuclide concentrations for the fuel rods and the water surrounding the fuel rods using the generated geometric configuration and generated fuel composition distribution. The computer is further configured to calculate neutron fluxes and gamma fluxes using a Monte Carlo radiation transport criticality mode methodology, and generate neutron and gamma fluence maps for predetermined areas of the reactor.

In another aspect, a computer program embodied on a computer readable medium for simulating three-dimensional spatial distribution of neutron and gamma fluences in a nuclear reactor is provided. The program includes a code segment that generates a detailed geometric configuration of a nuclear reactor core and surrounding components, generates a detailed fuel composition distribution, and calculates three-dimensional nuclide concentrations for the fuel rods and the water surrounding the fuel rods using the generated geometric configuration and generated fuel composition distribution. The program also includes a code segment that calculates neutron and gamma fluxes using a Monte Carlo radiation transport criticality mode methodology, and generates neutron and gamma fluence maps for predetermined areas of the reactor.

DETAILED DESCRIPTION OF THE INVENTION

Neutron and gamma fluence computational systems include a Monte Carlo computer program, a fuel simulator, a core simulator, and pre-, inter-, and post-processors among the Monte Carlo, fuel and core simulators, and are described below in detail. Interpolating various fuel exposure- and void-dependent nuclide data tracked by core and fuel simulators generates material composition input for the Monte Carlo program. The Monte Carlo computer program is run in a criticality mode in one exemplary embodiment, or in a combination of criticality mode and fixed source mode in another embodiment, to compute neutron and gamma fluxes at ex-core components of interest at various exposure points of operational cycles for a nuclear power reactor with detailed core and fuel configurations. The neutron and gamma fluxes at various exposure points of the cycles are then integrated over time to obtain the neutron and gamma fluence at the locations of interest. The neutron and gamma fluence computational systems produce more accurate fast neutron and gamma fluences than other existing methodologies and generate accurate thermal neutron fluence, both inside and outside the reactor core.

In one embodiment, the Monte Carlo, fuel and core simulator, and pre-, inter-, and post-processor software reside in a computer program product on computer readable media, for example, a magnetic floppy disk, a magnetic hard drive, CD drive or DVD drive. In the exemplary embodiment, the computer is networked VAX-VMS and PC-based work stations. In another embodiment, a main-frame computer or other workstations are used.

Computer modeling of the internal structure and components of a nuclear reactor pressure vessel and performing calculations of the behavior of neutron and gamma fluence inside the reactor pressure vessel yield design and operation benefits.

Figure 1:
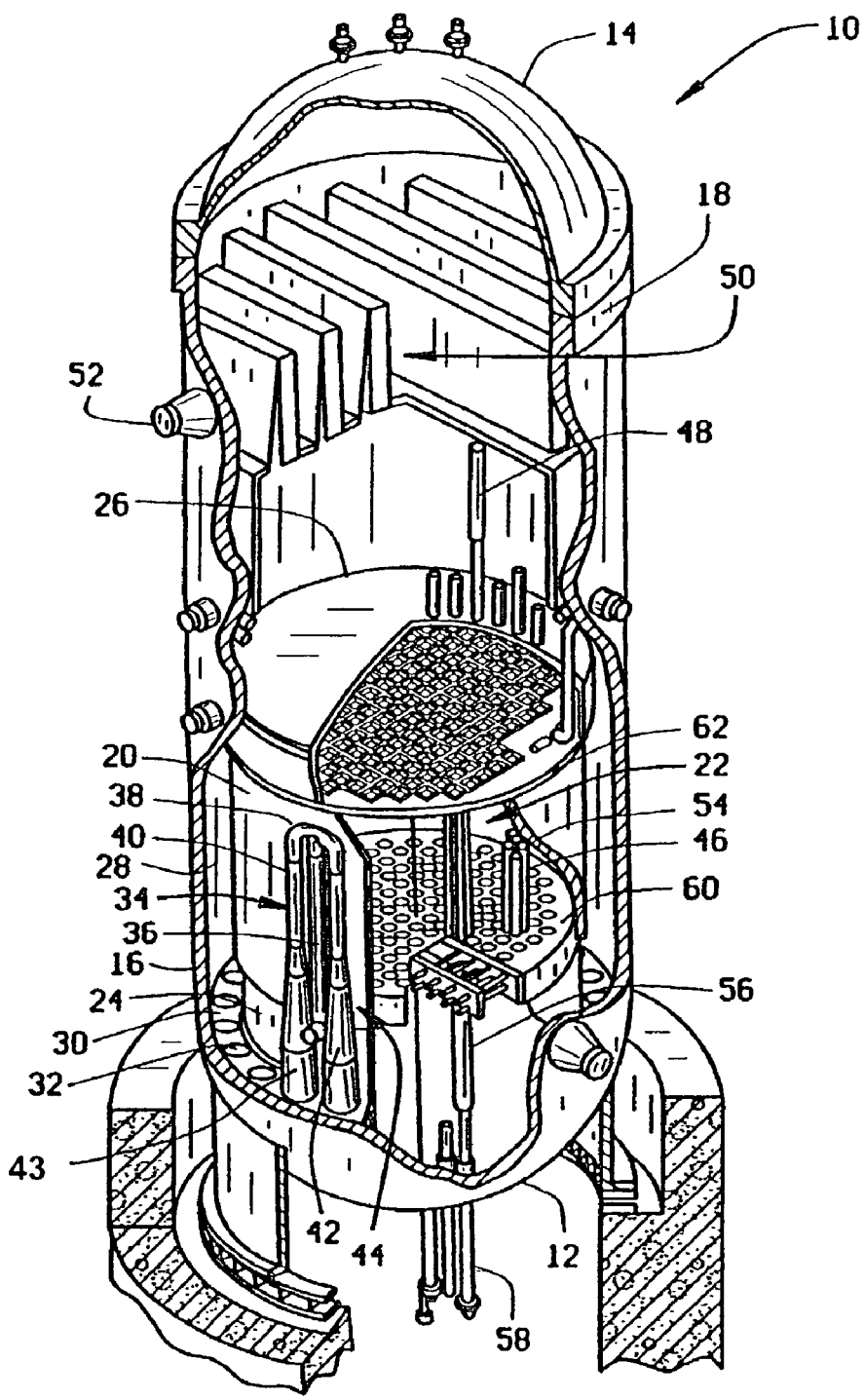
FIG. 1 is a sectional view, with parts cut away, of a boiling water nuclear reactor pressure vessel.

Referring to the drawings, FIG. 1 is a sectional view, with parts cut away, of a boiling water nuclear reactor pressure vessel (RPV) 10. RPV 10 has a generally cylindrical shape and is closed at one end by a bottom head 12 and at its other end by a removable top head 14. A side wall 16 extends from bottom head 12 to top head 14. Side wall 16 includes a top flange 18. Top head 14 is attached to top flange 18. A cylindrically shaped core shroud 20 surrounds a reactor core 22. Shroud 20 is supported at one end by a shroud support 24 and includes a removable shroud head 26 at the other end. An annulus 28 is formed between shroud 20 and side wall 16. A pump deck 30, which has a ring shape, extends between shroud support 24 and RPV side wall 16. Pump deck 30 includes a plurality of circular openings 32, with each opening housing a jet pump 34. Jet pumps 34 are circumferentially distributed around core shroud 20. An inlet riser pipe 36 is coupled to two jet pumps 34 by a transition assembly 38. Each jet pump 34 includes an inlet mixer 40, a diffuser 42, and a tailpipe assembly 43. Inlet riser 36 and two connected jet pumps 34 form a jet pump assembly 44.

Thermal power is generated within core 22, which includes fuel bundles 46 of fissionable material. Water circulated up through core 22 is at least partially converted to steam. Steam separators 48 separates steam from water, which is recirculated. Residual water is removed from the steam by steam dryers 50. The steam exits RPV 10 through a steam outlet 52 near vessel top head 14.

The amount of thermal power generated in core 22 is regulated by inserting and withdrawing control rods 54 of neutron absorbing material, such as for example, boron carbide. To the extent that control rod 54 is inserted into core 22 between fuel bundles 46, it absorbs neutrons that would otherwise be available to promote the chain reaction which generates thermal power in core 22. Control rod guide tubes 56 maintain the vertical motion of control rods 54 during insertion and withdrawal. Control rod drives 58 effect the insertion and withdrawal of control rods 54. Control rod drives 58 extend through bottom head 12.

Fuel bundles 46 are aligned by a core plate 60 located at the base of core 22. A top guide 62 aligns fuel bundles 46 as they are lowered into core 22. Core plate 60 and top guide 62 are supported by core shroud 20.

Figure 2:
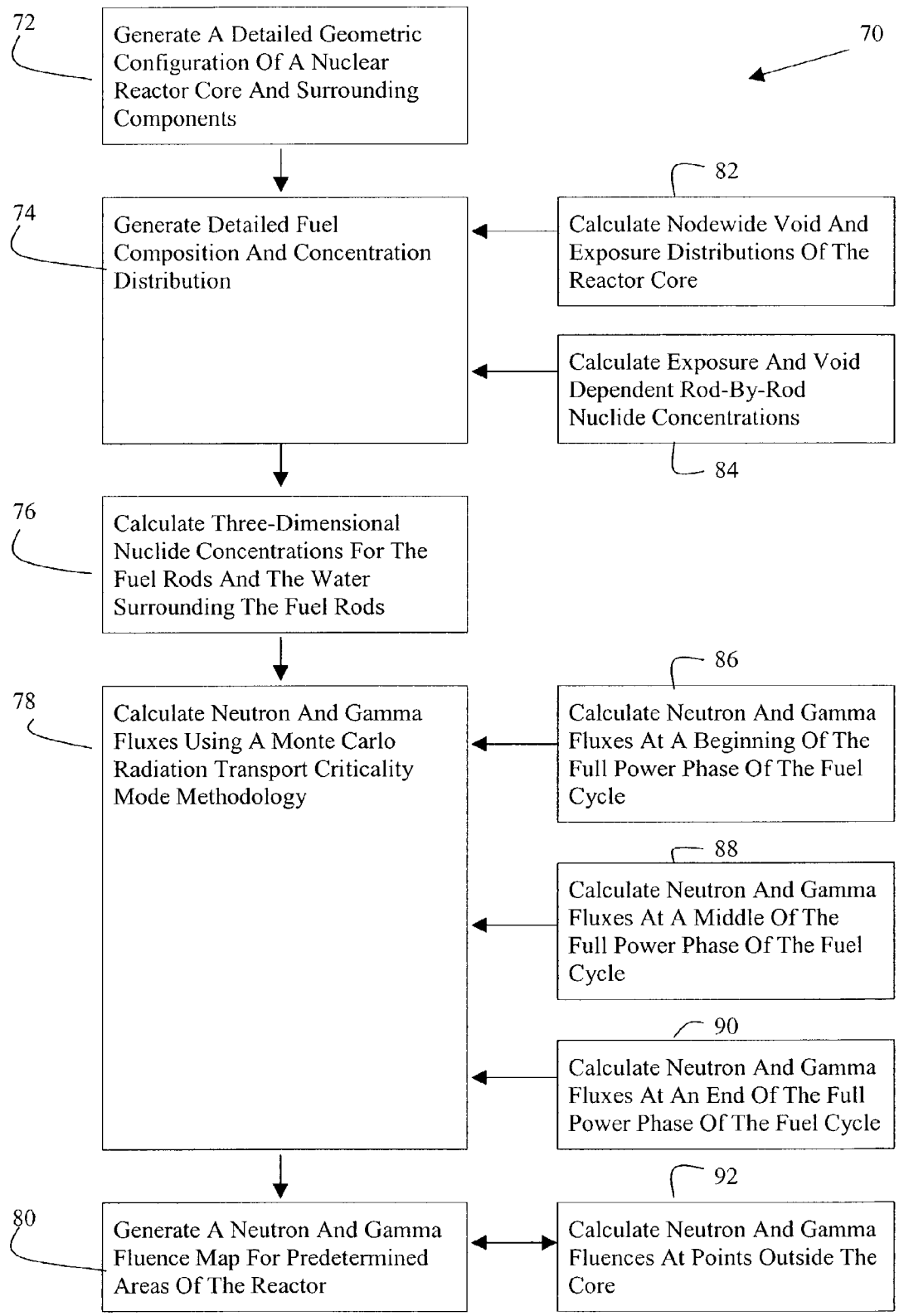
FIG. 2 is a flow chart of a method of simulating three-dimensional spatial distributions of neutron and gamma fluences in a nuclear reactor in accordance with an embodiment of the present invention.

FIG. 2 is a flow chart of a method 70 of simulating three-dimensional spatial distributions of neutron and gamma fluences in nuclear reactor 10 in accordance with an exemplary embodiment of the present invention. Method 70 includes generating 72 a detailed geometric configuration of nuclear reactor core 22 and surrounding components, generating 74 detailed fuel composition and concentration distributions, and calculating 76 three-dimensional nuclide concentrations for the fuel rods of fuel bundles 54 and the water surrounding the fuel rods. Method 70 also includes using the detailed geometric configuration of core 22, the detailed composition and concentration distributions, and the calculated three-dimensional nuclide concentrations for the fuel rods and the water surrounding the fuel rods as input to calculate 78 neutron and gamma fluxes using a continuous energy Monte Carlo radiation transport methodology using criticality mode or successive criticality mode and fixed-source mode solutions. Method 70 also includes using the calculated neutron and gamma fluxes to generate 80 a neutron and gamma fluence map for predetermined areas of reactor 10. Both thermal and fast neutron fluxes can be generated and Method 70 includes calculating at least one of thermal neutron fluxes and fast neutron fluxes and at least one of thermal neutron fluences and fast neutron fluences.

Generating 74 detailed fuel composition and concentration distributions include calculating 82 node-wise void and exposure distributions of reactor core 22 and calculating 84 exposure and void dependent rod-by-rod nuclide concentrations. Calculating 82 node-wise void and exposure distributions of reactor core 22 is accomplished in the exemplary embodiment by a 3-D neutron diffusion BWR simulator, for example, PANACEA. In alternate embodiments, other core tracking simulators can be used. Calculating 84 exposure and void dependent rod-by-rod nuclide concentrations is accomplished in the exemplary embodiment by a neutron transport and diffusion coupled lattice design computer program, for example, TGBLA. In alternate embodiments, other lattice design simulators can be used.

TGBLA uses ENDF/B-V cross-section library, integral transport theory methods to solve for cell neutron spectra in thermal, resonance and fast energy range, and leakage-dependent diffusion theory methods to solve for lattice $k\infty$ and power distribution. PANACEA receives lattice-averaged cross sections from TGBLA and solves a modified one-group diffusion equation for $k_{eff}$ and power distribution of a BWR core. The PANACEA $k_{eff}$ preserves the fundamental mode $k_{eff}$ of the three-group core neutron diffusion equations.

The ENDF (Evaluated Nuclear Data File) format libraries were originally developed in the United States and are controlled by the Cross Section Evaluation Working Group (CSEWG) of the US Department of Energy and maintained at the National Nuclear Data Center (NNDC) at the Brookhaven National Laboratory. In general, ENDF-format libraries are computer-readable files of nuclear data that describe nuclear reaction cross sections, the distributions in energy and angle of reaction products, the various nuclei produced during nuclear reactions, the decay modes and product spectra resulting from the decay of radioactive nuclei, and the estimated errors in these quantities.

The Monte Carlo radiation transport methodology is accomplished in the exemplary embodiment by, for example MCNP, a Monte Carlo code for neutron, photon, and electron transport. In alternate embodiments, other Monte Carlo programs can be used. The MCNP fuel composition input is generated by interpolating the fuel exposure- and void-dependent nuclide data tracked by PANACEA and TGBLA. Three dimensional nuclide concentrations for all segments of fuel rods and their surrounding water concentrations in core 22 are calculated for the MCNP input setup. The MCNP input is set up using an automation package called MIG (MCNP Input Generation Module). The MCNP calculations are performed at the beginning (BOC) 86, the middle (MOC) 88 and the end (EOC) 90 of the full power phase of the cycle. After each MCNP calculation, the bundle fast neutron flux is benchmarked against plant data using a MCNP output processing computer program, called POSTMC.

The data transfers from PANACEA and TGBLA through CEDAR (Comprehensive Engineering Data Archival and Retrieval) files using subroutines in the CEDAR computer program. A PANACEA core CEDAR file contains core node-wise exposure and instantaneous and historical void distributions, and a TGBLA lattice CEDAR file contains fuel lattice exposure- and void-dependent rod-by-rod nuclide concentrations at standard exposure points: 0, 0.2, 1, 2, 3, 4, 5, 6, 7, 8, 9, 10, 12.5, 15, 17.5, 20, 25, 30, . . . , 60 GWd/ST and at three standard void points: 0, 0.4 and 0.7 void fractions. Core bundle loading information and bundle lattice composition information are also input. The node-wise nuclide concentrations in each fuel rod of the core are determined through historical-void quadratic fitting and exposure linear fitting, and the surrounding water concentrations are determined using the instantaneous void data.

One of the major problems in performing detailed MCNP calculations is the huge amount of fuel composition input data. To reduce the fuel composition input size with minimal sacrifice of accuracy, the following approximations are made in the physics model:

1. Nuclide concentrations in interior regular fuel rods of each lattice are lumped together by preserving the absorption rates.

2. Nuclide concentrations in gadolinia fuel rods of each lattice are lumped by preserving the absorption rates, based on distinct initial Gd rod types; the types are differentiated by different gadolinia weight percent and/or different enrichment.

3. Thirty-seven explicit nuclides, including major fissionable nuclides and fission products are used, as shown below in Table I, and other minor nuclides are incorporated in and represented implicitly by the explicit nuclides in terms of effective concentrations by preserving the absorption rate. For example, a multiplier on $^{103}$Rh is used to accommodate the pseudo fission product, $^{143}$Pr, $^{101}$Ru and $^{103}$Ru by preserving the absorption rate.

4. Octant or quarter-symmetric fuel loading is used.

5. Distinct axial nodes are used.

TABLE I

37 Explicit Nuclides Model

| ID | Nuclides |
|---|---|
| 1 | U234 |
| 2 | U235 |
| 3 | U236 |
| 4 | U238 |
| 5 | Pu239 |
| 6 | Pu240 |
| 7 | Pu241 |
| 8 | Pu242 |
| 9 | Np237 + N1* |
| 10 | Pu238 |
| 11 | Am241 |
| 12 | Am243 |
| 13 | Cm244 |
| 14 | Rh103 + N2* |
| 15 | Rh105 |
| 16 | Cs133 |
| 17 | Xe135 |
| 18 | Nd143 |
| 19 | Tc99 |
| 20 | Xe131 + N3* |
| 21 | Pm147 + N4* |
| 22 | Pm148 m |
| 23 | Sm147 |
| 24 | Sm149 |
| 25 | Sm150 |
| 26 | Sm151 |
| 27 | Sm152 |
| 28 | Eu153 |
| 29 | Eu154 |
| 30 | Eu155 |
| 31 | Gd154 |
| 32 | Gd155 |
| 33 | Gd156 |
| 34 | Gd157 |
| 35 | Gd158 |
| 36 | Nd145 |
| 37 | O16 |

*N1 are Np239 and Cm242; N2 are Pseudo fission product, Pr143, Ru101 and Ru103; N3 is Xe133; N4 is Pm149.

From experimentation, it was discovered that the results of MCNP in-core neutronic calculations are sensitive to the distribution of water and $^{135}$Xe for a given fuel composition setup in the core. Consequently, the axial in-channel and out-channel water densities and $^{135}$Xe concentrations are examined. The nodal water densities and the nodal in-channel void fractions are available in the PANACEA output, from which axial in-channel and out-channel water densities are derived fr each nodal lattice. A set of typical axial in-channel and out-channel water density distribution in a peripheral bundle and in a central bundle are shown below in TABLE II.

TABLE II

Typical Axial In-Channel and Out-Channel Water Density (G/Cm$^3$) Distribution in a Peripheral Bundle and in a Central Bundle

| Type | Peripheral Bundle (1, 8) | | Central Bundle (9, 9) | |
|---|---|---|---|---|
| Axial node | In-channel | Out-channel | In-channel | Out-channel |
| 1 | 0.76289 | 0.76314 | 0.76280 | 0.76305 |
| 2 | 0.76177 | 0.76314 | 0.76124 | 0.76260 |
| 3 | 0.76015 | 0.76237 | 0.75890 | 0.76077 |
| 4 | 0.75840 | 0.76115 | 0.75636 | 0.75858 |
| 5 | 0.75653 | 0.75969 | 0.75368 | 0.75608 |
| 6 | 0.75454 | 0.75797 | 0.73573 | 0.75587 |
| 7 | 0.75243 | 0.75598 | 0.72030 | 0.75574 |

TABLE II-continued

Typical Axial In-Channel and Out-Channel Water Density (G/Cm³) Distribution in a Peripheral Bundle and in a Central Bundle

| Type | Peripheral Bundle (1, 8) | | Central Bundle (9, 9) | |
| --- | --- | --- | --- | --- |
| Axial node | In-channel | Out-channel | In-channel | Out-channel |
| 8 | 0.73743 | 0.75573 | 0.68875 | 0.75570 |
| 9 | 0.73486 | 0.75554 | 0.64638 | 0.75372 |
| 10 | 0.72384 | 0.75543 | 0.59971 | 0.75343 |
| 11 | 0.70434 | 0.75539 | 0.55323 | 0.75313 |
| 12 | 0.67857 | 0.75227 | 0.51013 | 0.75280 |
| 13 | 0.64944 | 0.75094 | 0.47138 | 0.75243 |
| 14 | 0.61930 | 0.75049 | 0.43713 | 0.75202 |
| 15 | 0.58886 | 0.75008 | 0.40716 | 0.75158 |
| 16 | 0.55955 | 0.74959 | 0.38016 | 0.75111 |
| 17 | 0.53144 | 0.74912 | 0.36001 | 0.75050 |
| 18 | 0.50484 | 0.74865 | 0.34152 | 0.75004 |
| 19 | 0.48042 | 0.74818 | 0.32456 | 0.74957 |
| 20 | 0.45818 | 0.74772 | 0.30944 | 0.74911 |
| 21 | 0.43824 | 0.74728 | 0.29597 | 0.74865 |
| 22 | 0.42094 | 0.74686 | 0.28422 | 0.74821 |
| 23 | 0.40686 | 0.74647 | 0.27443 | 0.74779 |
| 24 | 0.39632 | 0.74614 | 0.26813 | 0.74744 |
| 25 | 0.39042 | 0.74590 | 0.26578 | 0.74715 |

Since the $^{135}$Xe concentrations are generated by assuming constant power density (normally, 50 W/cm³) in TGBLA depletion and since the $^{135}$Xe concentrations are sensitive to the local power history, the power-consistent $^{135}$Xe concentrations are determined by PANACEA-local-power weighting and by assuming that $^{135}$Xe concentrations reach equilibrium. Note that the equilibrium $^{135}$Xe concentration ($^{135}$Xe$_{eq}$) is given by:

$$^{135}Xe_{eq} = \frac{(\gamma_I + \gamma_{Xe})(\text{Power density})}{\lambda_{Xe} + \sigma_{a,Xe}\phi_T}$$

where $\gamma_I$ and $\gamma_{Xe}$ are fission yield of $^{135}$I and $^{135}$Xe, $\lambda_{Xe}$ is the decay constant of $^{135}$Xe, $\sigma_{a,Xe}$ is the microscopic absorption cross section of $^{135}$Xe, and $\phi_T$ is the neutron flux. Consequently, the equilibrium $^{135}$Xe concentration is roughly proportional to the local power.

Incorporating all preceding approximations in PREMC, an MCNP input processing computer program, and performing the PREMC calculations yield the node-wise fuel rod nuclide concentrations for the MCNP input.

The Monte Carlo based portion of the calculations includes three stages. The first stage involves the development of the reactor system model. The next stage creates core models based at various discrete points in the fuel cycle. The core model at each statepoint is merged with the reactor system model, and criticality calculations are performed to obtain neutron and gamma fields in the annular region of the reactor. This is done using the MCNP Monte Carlo N-Particle radiation transport computer code available from Los Alamos National Laboratory. The last stage generates a neutron and gamma fluence map in predetermined areas, for example, shroud weld locations. Method 70 includes calculating 92 neutron and gamma fluences at points outside the core, for example, the down comer region.

Figure 3:
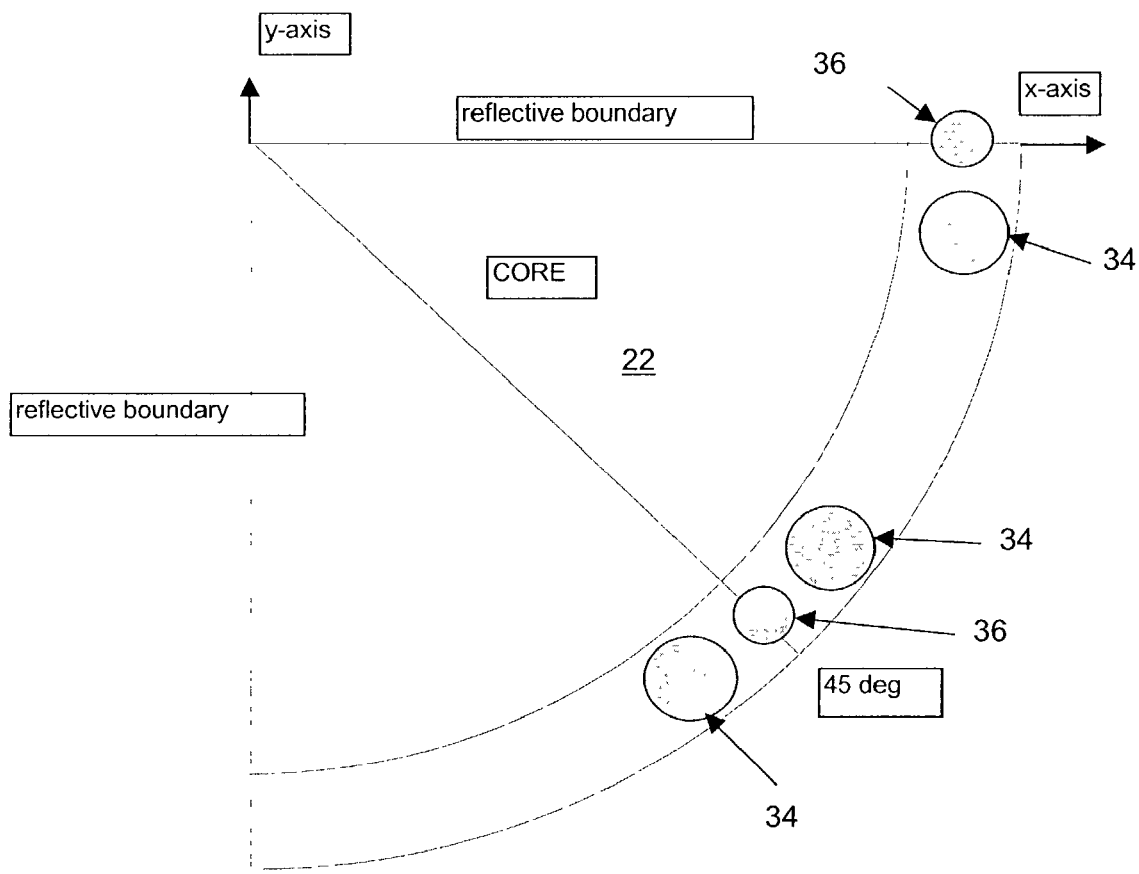
FIG. 3 is a simple r-θ view of an MNCP model.

The MCNP model is built in two parts. The first part consists of modeling the in-shroud region of the reactor, excluding the fuel bundles, the RPV, and the annular region between the RPV and the shroud, including the appropriate number of jet pumps. This model remains fixed for the entire cycle. The next part consists of using the processed fuel and in-core water data obtained from the PANACEA/TGBLA runs and processed with the PREMC processor to obtain an MCNP model of the core. The in-core data remains fixed for a given discrete time step and changes whenever discrete time steps are taken to simulate the whole cycle. The model is set up with quadrant symmetry to accommodate jet pumps 34. FIG. 3 shows a simple r-θ view of the model. The x and y axes have reflective boundary conditions (i.e., any particle that reaches either surface undergoes specular reflection). The region outside the RPV wall is void.

Figure 4:
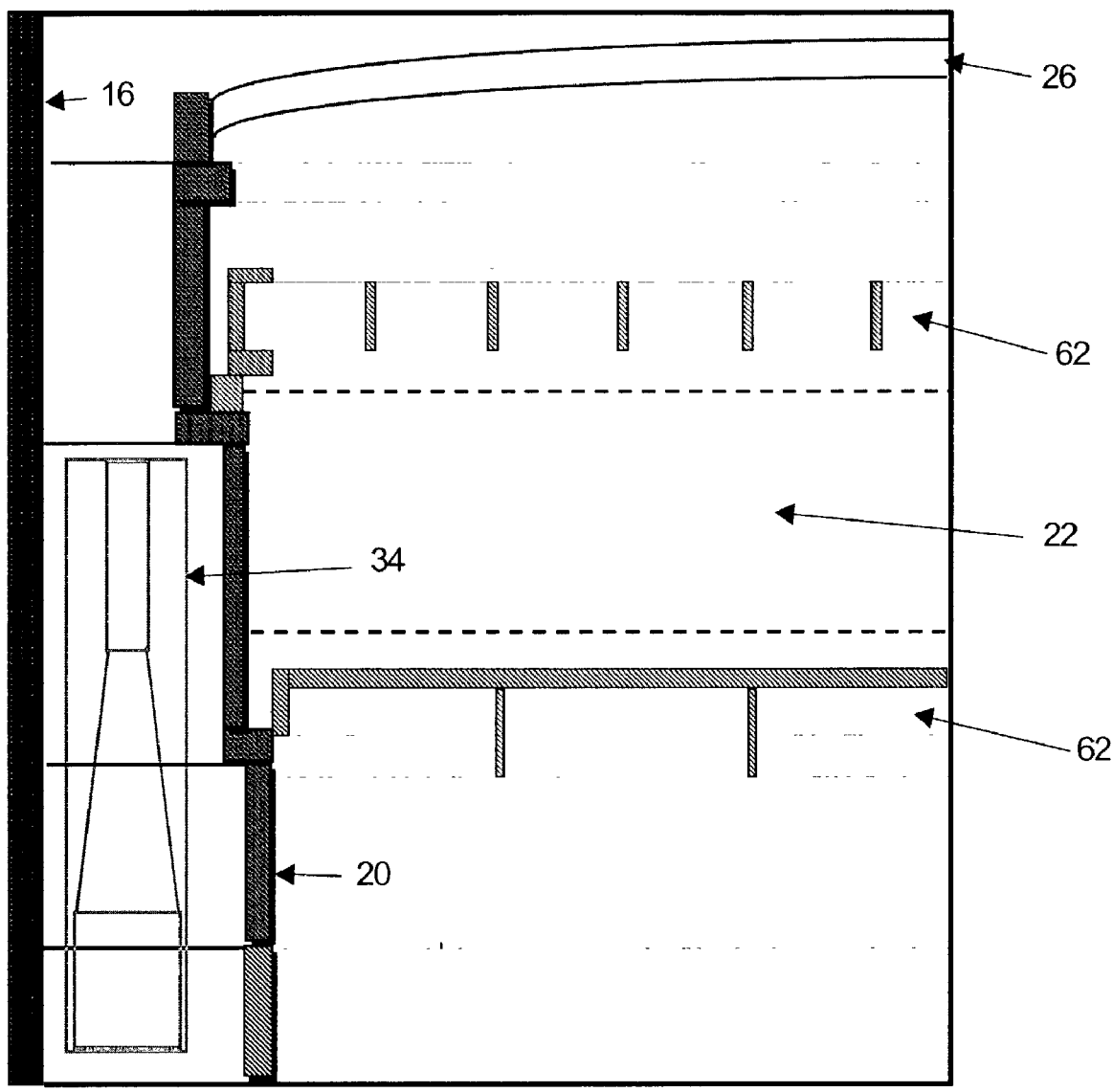
FIG. 4 is a simple schematic r–z view of the boiling water nuclear reactor pressure vessel shown in FIG. 1.

FIG. 4 shows a schematic with the r-z view of the system. The inside of shroud 20 is modeled with the appropriate systems inside it modeled explicitly. The bottom of the model is at an elevation of 180 cm from RPV bottom head 12. Control rod guide tubes 56 are modeled with control rod 54 present. These extended from elevation 180 through core plate 60. Core plate 60 and the support beams are also modeled explicitly. Control rods 54 are modeled in detail with the central support, blade wing sheaths, and the poison tubes (not shown).

Reactor core 22 is modeled above core plate 60, and top guide 62 is modeled without the top of the fuel bundles 46 that are present in them. No structural components are modeled above top guide 62. The shroud wall and shroud head 26 and RPV wall 16 are all modeled with their nominal dimensions.

A simple jet pump model is developed with the ram's head 38, mixer 40, diffuser 42, and tailpipe assemblies 43 (shown in FIG. 1). At the present time, the brackets and other support hardware associated with jet pumps 34 have been omitted. The model required one full pair of jet pumps 34 with a riser 36 and a half set, as shown in FIG. 3, to account for 12 pumps 34 and six risers 36. The jet pump model is created independently and patched into the reactor system model using the proper coordinate transformations.

In the exemplary embodiment, the structural material specifications are as follows:

The shroud wall between 180 cm. and 236.2 cm: Inconel of density 8.51 g/cc.

The remainder of the shroud wall: 304 stainless steel of density 7.9 g/cc.

The core plate, top guide: 304 stainless steel of density 7.9 g/ee.

All jet pump components: 304 stainless steel of density 7.9 g/cc.

Control rod guide tubes: 304 stainless steel of density 7.9 g/cc.

Blade structure: 304 stainless steel of density 7.9 g/cc.

Poison tubes: B$_4$C with a density of 1.75 g/cc.

The in-core model is developed separately and merged with the reactor system model to produce the full calculational model for the MCNP criticality calculation.

In the exemplary embodiment, the active core region is modeled with 25 distinct axial nodes, each 15.24 cm high (6 inches). This scheme is consistent with the simulator code, PANACEA. Each node has a different average exposure and in-channel void fraction, making it necessary to model 1500 different lattices in a quarter core (25 nodes×60 bundles). In the early part of the cycle, octant symmetric blade patterns make it possible to have octant symmetric fuel and void distributions, thus reducing the number of unique lattices to 825 (25 nodes×33 bundles). The channels and fuel rod cladding are standard Zircaloy, approximated in the model as natural zirconium.

Inside each channel of the fuel lattices, the fuel rods having a fuel composition and the appropriate water density are modeled. The process of generating the input for the core model in MCNP was fully automated to accommodate either quadrant symmetric or octant symmetric fuel specifications. The model also uses the repeated structures capabilities of MCNP to minimize the size of the input. The simulation can be run on any suitable computer system, for example, a DEC Alpha-500 workstation with the Open VMS Version 7.1 operating system.

In the exemplary embodiment, four exposure points in the fuel cycle of reactor 10 are selected to study. These are at cycle exposures of BOC, MOC, EOC, and a point representing a state that is approximately midway during the coastdown phase of the fuel cycle. These cases are run and a source for each case is saved on a surface that encompasses the core region at a radius of 151 cm. An intermediate run is made using the quadrant symmetric model and the surface source for each exposure point. The angular, energy and spatial distributions are saved on surfaces that were within 0.025 cm of the surface source. Twenty-four azimuths and twenty-five axial regions are used for obtaining the spatial distributions. The angle and energy distributions are obtained in three axial regions: low, middle and top regions. Separate runs are made for fast and thermal cases. The distributions obtained from the intermediate runs are then used to describe a fixed source and the final runs to obtain specific activities at predetermined locations.

The 24 azimuthal regions are expanded to 90 azimuthal regions plus 18 regions in the volume beyond the y-axis, for a total of 108 azimuthal regions. Typically, a sector is divided into 3 or 4 equal sectors each with a source probability of one-third or quarter the original probability. The energy and angular distributions of the original sector are used in each of these sub-sectors. Axially all 25 nodes were present. The information from the intermediate run is processed into the 2700 (108×25) regions and the correct spatial, energy and angular distributions are specified using the generalized source setup in MCNP. The regions all had thickness of 0.001 cm and represented degenerate cylindrical volume sources. The reference direction for determining the angle of the source particle is fixed as the angle bisecting each sector, rather than the unit outward normal at the starting point on a cylindrical surface. The angle and energy distributions are dependent on the cell where the source particle is started. The starting weight for each source particle is set to 1. The final correct weight is applied to the tallies when the absolute source term is calculated at each exposure point. This weight took into account the original weight from the criticality calculation crossing the surface per source neutron. Thus, the absolute values of the specific activities can be calculated using the power and other quantities at each state point.

The reaction rates per source neutron obtained from the MCNP runs are converted into actual reaction rates using the appropriate power at the particular point in the cycle. These are then converted to the appropriate activities at the end of cycle using simple time convolution with the correct decay terms. These calculations are done for the four state points chosen.

If $T_N$ is the total cycle time, then the activity per gram at EOC for a time step $(T_i-T_{i-1})$ is given by, $$A_g(T_i) = (\gamma \Sigma_{p,i} \phi_i \lambda / \Lambda_i \rho)[1-e^{-\Lambda_i \Delta T_i}]e^{-\Lambda_i(T_N-T_i)}$$

where $\Sigma_{p,i}$ = production cross section, $cm_{-1}$ (fission, n–γ, etc.) at time step i.

$\phi_i$ = flux (fast or thermal as appropriate) in neutrons/cm2-sec at time step i.

γ=1 for non-fission product isotopes.

=yield fraction for fission product isotope.

$\Lambda$=effective decay constant, $sec^{-1}$, which includes the standard decay constant, λ, and a removal term due to absorption in the activation product, $\sigma_r \phi$, or $\Lambda = \lambda + \sigma_r \phi$ and, $$\Lambda_1 = \lambda + \left\{\left[\sum_{j=1}^{N} \sigma_{r,j} \phi_j \Delta T_j\right] \Big/ \sum_{j=1}^{N} \Delta T_j\right\}.$$

ρ=density of the wire in g/cc.

Here $\Delta T_i$ is the time interval for time step i, and $T_N-T_i$ represents the time from the end of time step i to EOC. Thus, the first decay term in brackets represents the period when both production and decay is occurring and the second decay term, $e^{-\Lambda_i(T_N-T_1)}$, represents decay alone for the remaining time to the EOC. Usually, in the annulus region, the removal of the activation product by absorption is negligible ($\lambda >> \sigma_r \phi$) and the decay constant reverts to the true decay constant, λ. The total activity per gram at EOC is given by summing the individual time step values.

$$\text{Total } A_g(T_N) = \sum_i \left(\gamma \sum_{p,i} \phi_i / \rho\right)[1-e^{-\lambda \Delta T}]e^{-\lambda(T_N-T_1)}$$

This number is compared with the measured dps/g data obtained from the tests. The calculation-to-measurement ratios (C/M ratios) were used as a measure of the validity of the calculations and validity of the calculated thermal and fast neutron fields.

An adequate representation of the ex-core water density distribution is important for reliable fluence and dose rate calculations. In the outer bypass region (the region between the core and the shroud), there is an axial and radial variation in the water density distribution due to the existing temperature gradient. However, this variation is small and an average density of 0.762 g/cc is used. On the other side, the temperature gradient variation is more significant in the annular region between the shroud and the RPV due to the following facts:

1. Large temperature differences exist between the RPV outer wall (at about 50° C.) and the shroud outer wall (at about 270° C.).

2. Feedwater supply from the sparger nozzle jets is not uniformly distributed.

3. The mixing of the steam-separator-discharged water and the feedwater through the annular region is affected by the flow path geometry differences; for example, the temperature gradient across the annular region in the presence of jet pumps is quite different from that in the absence of jet pumps.

Consequently, different radial temperature gradient profiles exist along various azimuthal directions. Therefore, different radial water density distributions are used in the fluence calculations for different sets of azimuthal cases.

In the absence of any detailed thermal hydraulic data for obtaining the actual water density distribution profile, an effective physical model is used to develop the water density profile such that the total amount of water across the annulus region is preserved. This is achieved by gradually increasing the density radially outward while preserving the total water mass. About 12 cm from the RPV wall, the slope was increased due the fact that there is a larger temperature gradient between the water and the RPV. In addition, the radial water density profile also has an axial dependence due to the different degree of water mixing during the downward flow. In the present model, the axial variation of the radial water density profile is ignored and a single profile is used throughout the cycle.

The nuclear data used is derived from a combination of ENDF/B-V and ENDF/B-VI data. The data is processed into a continuous energy form for neutrons at the operating temperatures for the fuels. Thermal scattering data for hydrogen in water is also used to treat this phenomenon. ENDF/B-V data is used for the core calculations, since it has been shown by careful benchmarking of light water reactor critical experiments, that the combination of MCNP and ENDF/B-V data produces the best results. ENDF/B-VI data is used for iron and oxygen and all the activation reactions. For example, the cross section of iron has undergone many revisions and, since the ENDF/B-VI represents the latest set of available data, this set presents the best choice for these simulations. In all cases, continuous energy data is used.

The gamma fluence estimation calculations are done in two steps. A direct criticality calculation, with a saved surface source, is used to determine the gamma fluxes caused by direct gammas from the core. This calculation also accounts for delayed gammas coming from fission products from the actinide chains. A second calculation uses the thermal neutron model to generate the estimates from the neutron induced gammas outside the saved source. The sum of these two calculations produces the gamma fluxes.

Gamma fluences have statistical uncertainties associated with them similar in magnitude to those of the neutrons. Other sources of error associated with the thermal neutrons can also be applied as a best estimate to the gamma results since the local gammas are produced principally by the thermal neutrons. However, it must also be remembered that the gammas have very long mean free paths and the associated errors depend on more than just local features in composition and geometry. The gamma fluences are a combination of those direct from the core and those produced by neutrons outside the core.

While the invention has been described in terms of various specific embodiments, those skilled in the art will recognize that the invention can be practiced with modification within the spirit and scope of the claims.

What is claimed is:

1. A computer-implemented method for simulating three-dimensional spatial distributions of neutron and gamma fluences in a nuclear reactor, the reactor comprising a reactor pressure vessel, a reactor core surrounded by a core shroud positioned in the reactor pressure vessel, said method comprising:

generating a detailed geometric configuration of a nuclear reactor core and surrounding components;
generating a detailed fuel composition distribution;
calculating three-dimensional nuclide concentrations for the fuel rods and the water surrounding the fuel rods using the generated geometric configuration and generated fuel composition distribution;
calculating neutron and gamma fluxes using a Monte Carlo radiation transport criticality mode methodology;
calculating neutron and gamma fluences at points outside the core; and
generating neutron and gamma fluence maps for predetermined areas of the reactor based on the calculated neutron and gamma fluxes and the calculated neutron and gamma fluences at points outside the core; and
displaying the fluence maps;

wherein calculating neutron and gamma fluences at points outside the core comprises:
calculating neutron and gamma fluxes using the Monte Carlo radiation transport criticality mode methodology;
saving a surface source based on the core periphery; and
calculating neutron and gamma fluxes using a Monte Carlo radiation transport fixed-source mode methodology based on the surface source using an adequate number of sampling histories to obtain a predetermined level of convergence.

2. A method in accordance with claim 1 wherein calculating neutron and gamma fluxes comprises calculating neutron and gamma fluxes using at least one of a Monte Carlo radiation transport criticality mode methodology and a Monte Carlo radiation transport successive criticality mode and fixed source mode methodology.

3. A method in accordance with claim 1 wherein generating a detailed fuel composition distribution comprises:
calculating node-wise void and exposure distributions of the reactor core; and
calculating exposure and void dependent rod-by-rod nuclide concentrations.

4. A method in accordance with claim 3 wherein calculating three-dimensional nuclide concentrations for the fuel rods and the water surrounding the fuel rods comprises interpolating the node-wide void and exposure distributions of the reactor core and the exposure and void dependent rod-by-rod nuclide concentrations to generate input for the Monte Carlo radiation transport criticality mode methodology.

5. A method in accordance with claim 4 wherein calculating neutron and gamma fluxes comprises calculating neutron and gamma fluxes using at least one of a Monte Carlo radiation transport criticality mode methodology and a Monte Carlo radiation transport successive criticality mode and fixed source mode methodology at a beginning of a full power phase of a fuel cycle.

6. A method in accordance with claim 5 wherein calculating neutron and gamma fluxes further comprises calculating neutron and gamma fluxes using at least one of a Monte Carlo radiation transport criticality mode methodology and a Monte Carlo radiation transport successive criticality mode and fixed source mode methodology at a middle of the full power phase of the fuel cycle.

7. A method in accordance with claim 6 wherein calculating neutron and gamma fluxes further comprises calculating neutron and gamma fluxes using at least one of a Monte Carlo radiation transport criticality mode methodology and a Monte Carlo radiation transport successive criticality mode and fixed source mode methodology at an end of the full power phase of the fuel cycle.

8. A method in accordance with claim 4 further comprises integrating neutron and gamma fluxes at predetermined exposure points of the fuel cycle over time to obtain neutron and gamma fluences at the predetermined exposure points.

9. A system for simulating three-dimensional spatial distributions of neutron and gamma fluences in a nuclear reactor, the reactor comprising a reactor pressure vessel, a reactor core surrounded by a core shroud positioned in the reactor pressure vessel, said system comprising a computer configured to:

generate a detailed geometric configuration of a nuclear reactor core and surrounding components;

generate a detailed fuel composition distribution;

calculate three-dimensional nuclide concentrations for the fuel rods and the water surrounding the fuel rods using the generated geometric configuration and generated fuel composition distributions;

calculate neutron and gamma fluxes using a Monte Carlo radiation transport criticality mode methodology;

calculate neutron and gamma fluences at points outside the core; and generate a neutron and gamma fluence map for predetermined areas of the reactor based on the calculated neutron and gamma fluxes and the calculated neutron and gamma fluences at points outside the core; and display the fluence maps;

wherein the neutron and gamma fluences at points outside the core are calculated by:

calculating neutron and gamma fluxes using a Monte Carlo radiation transport criticality mode methodology;

saving a surface source based on the core periphery; and calculating neutron and gamma fluxes using a Monte Carlo radiation transport fixed-source mode methodology based on the surface source using an adequate number of sampling histories to obtain a predetermined level of convergence.

10. A system in accordance with claim 9 wherein said computer further configured to calculate neutron and gamma fluxes using at least one of a Monte Carlo radiation transport criticality mode methodology and a Monte Carlo radiation transport successive criticality mode and fixed source mode methodology.

11. A system in accordance with claim 9 wherein said computer further configured to:

calculate node-wise void and exposure distributions of the reactor core; and calculate exposure and void dependent rod-by-rod nuclide concentrations.

12. A system in accordance with claim 11 wherein said computer further configured to interpolate the node-wide void and exposure distributions of the reactor core and the exposure and void dependent rod-by-rod nuclide concentrations to generate input for the Monte Carlo radiation transport criticality mode methodology.

13. A system in accordance with claim 12 wherein said computer further configured to calculate neutron and gamma fluxes using at least one of a Monte Carlo radiation transport criticality mode methodology and a Monte Carlo radiation transport successive criticality mode and fixed source mode methodology at a beginning of a full power phase of a fuel cycle.

14. A system in accordance with claim 13 wherein said computer further configured to calculate neutron and gamma fluxes using at least one of a Monte Carlo radiation transport criticality mode methodology and a Monte Carlo radiation transport successive criticality mode and fixed source mode methodology at a middle of the full power phase of the fuel cycle.

15. A system in accordance with claim 14 wherein said computer further configured to calculate neutron and gamma fluxes using at least one of a Monte Carlo radiation transport criticality mode methodology and a Monte Carlo radiation transport successive criticality mode and fixed source mode methodology at an end of the full power phase of the fuel cycle.

16. A system in accordance with claim 11 wherein said computer further configured to integrate neutron and gamma fluxes at predetermined exposure points of the fuel cycle over time to obtain neutron and gamma fluences at the predetermined exposure points.

17. A computer program embodied on a computer readable medium for simulating three-dimensional spatial distributions of neutron and gamma fluences in a nuclear reactor, the reactor comprising a reactor pressure vessel, a reactor core surrounded by a core shroud positioned in the reactor pressure vessel, said program comprising a code segment that, when executed:

generates a detailed geometric configuration of a nuclear reactor core and surrounding components;

generates a detailed fuel composition distribution;

calculates three-dimensional nuclide concentrations for the fuel rods and the water surrounding the fuel rods using the generated geometric configuration and generation fuel composition and concentration distributions;

calculates neutron and gamma fluxes using a Monte Carlo radiation transport criticality mode methodology;

calculates neutron and gamma fluences at points outside the core; and generates a neutron and gamma fluence map for predetermined areas of the reactor based on the calculated neutron and gamma fluxes and the calculated neutron and gamma fluences at points outside the core; and displays the fluence maps;

wherein the neutron and gamma fluences at points outside the core are calculated by:

calculating neutron and gamma fluxes using a Monte Carlo radiation transport criticality mode methodology;

saving a surface source based on the core periphery; and calculating neutron and gamma fluxes using a Monte Carlo radiation transport fixed-source mode methodology based on the surface source using an adequate number of sampling histories to obtain a predetermined level of convergence.

18. A computer program in accordance with claim 17 further comprising a code segment that calculates neutron and gamma fluxes using at least one of a Monte Carlo radiation transport criticality mode methodology and a Monte Carlo radiation transport successive criticality mode and fixed source mode methodology.

19. A computer program in accordance with claim 17 further comprising a code segment that:

calculates node-wise void and exposure distributions of the reactor core; and calculates exposure and void dependent rod-by-rod nuclide concentrations.

20. A computer program in accordance with claim 19 further comprising a code segment that interpolates the node-wide void and exposure distributions of the reactor core and the exposure and void dependent rod-by-rod nuclide concentrations to generate input for the Monte Carlo radiation transport criticality mode methodology.

21. A computer program in accordance with claim 20 further comprising a code segment that calculates neutron and gamma fluxes using at least one of a Monte Carlo radiation transport criticality mode methodology and a Monte Carlo radiation transport successive criticality mode and fixed source mode methodology at a beginning of a full power phase of a fuel cycle.

22. A computer program in accordance with claim 21 further comprising a code segment that calculates neutron and gamma fluxes using at least one of a Monte Carlo radiation transport criticality mode methodology and a Monte Carlo radiation transport successive criticality mode and fixed source mode methodology at a middle of the full power phase of the fuel cycle.

23. A computer program in accordance with claim 22 further comprising a code segment that calculates neutron and gamma fluxes using at least one of a Monte Carlo radiation transport criticality mode methodology and a Monte Carlo radiation transport successive criticality mode and fixed source mode methodology at an end of the full power phase of the fuel cycle.

24. A computer program in accordance with claim 23 further comprising a code segment that integrate neutron and gamma fluxes at predetermined exposure points of the fuel cycle over time to obtain neutron and gamma fluences at the predetermined exposure points.

* * * * *